United States Patent
Schumacher et al.

(10) Patent No.: US 10,657,809 B2
(45) Date of Patent: May 19, 2020

(54) AUTOMATIC LEARNING FOR VEHICLE CLASSIFICATION

(71) Applicant: 3M INNOVATIVE PROPERTIES COMPANY, St. Paul, MN (US)

(72) Inventors: Stephanie R. Schumacher, York (GB); Brian D. Smith, West Sussex (GB)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 88 days.

(21) Appl. No.: 15/772,106

(22) PCT Filed: Dec. 29, 2016

(86) PCT No.: PCT/US2016/069130
§ 371 (c)(1),
(2) Date: Apr. 30, 2018

(87) PCT Pub. No.: WO2017/117359
PCT Pub. Date: Jul. 6, 2017

(65) Prior Publication Data
US 2018/0322778 A1    Nov. 8, 2018

Related U.S. Application Data

(60) Provisional application No. 62/272,746, filed on Dec. 30, 2015.

(51) Int. Cl.
*G08G 1/01* (2006.01)
*G08G 1/017* (2006.01)
(Continued)

(52) U.S. Cl.
CPC ....... *G08G 1/0175* (2013.01); *G06K 9/00785* (2013.01); *G06K 9/325* (2013.01); *G06K 9/6263* (2013.01); *G06N 20/00* (2019.01)

(58) Field of Classification Search
None
See application file for complete search history.

(56) References Cited

U.S. PATENT DOCUMENTS

| 5,434,927 A | 7/1995 | Brady et al. |
| 2006/0200307 A1* | 9/2006 | Riess ................. G06K 9/00785 701/408 |

(Continued)

OTHER PUBLICATIONS

PCT International Search Report from PCT/US2016/069130, dated Apr. 10, 2017, 4 pages.

*Primary Examiner* — Fayyaz Alam

(57) ABSTRACT

The present disclosure provides an automatically updating vehicle classification system and method. The system comprises a processor which extracts from a vehicle image at least one of: a unique vehicle identifier from the vehicle image and visual features of the vehicle in the vehicle image. If the visual features are below a probability threshold for matching a vehicle class in a local database, the processor looks up the unique vehicle identifier in a registration database. The registration database stores vehicle registration information including unique vehicle identifiers and associated vehicle class information. If the vehicle class information associated with the vehicle identifier is not a class recognized by the processor, the processor creates a new vehicle class associated with the visual features of the vehicle.

20 Claims, 3 Drawing Sheets

(51) Int. Cl.
*G06K 9/00* (2006.01)
*G06K 9/62* (2006.01)
*G06K 9/32* (2006.01)
*G06N 20/00* (2019.01)

(56) References Cited

U.S. PATENT DOCUMENTS

2013/0246321 A1    9/2013  Pandit et al.
2015/0049914 A1*  2/2015  Alves .................... G06K 9/033
                                                    382/105

* cited by examiner

AUTOMATIC LEARNING FOR VEHICLE CLASSIFICATION

FIELD OF INVENTION

The present invention relates to an automatic learning system and method for vehicle classification using machine vision. The system and method accesses a vehicle registration database for creation of new vehicle classes.

BACKGROUND

Machine vision detection and identification of vehicles is used within many traffic applications, including tolling, traffic data collection, and vehicle search or tracking. Machine vision systems, such as those using visible light or infrared (IR) cameras, can be used to identify vehicles by capturing and reading an identifier from a license plate or number plate (used interchangeably herein) on the vehicle. Machine vision systems can also be used to generally detect the presence of a vehicle and to identify the type of vehicle or a class into which the vehicle fits. Identification of the class of a vehicle is useful for many reasons, such as confirming that the unique identifier on the license plate is on the correct type of vehicle (i.e., the license plate is not stolen), and for knowing how much a vehicle should be charged in a tolling or traffic congestion scheme based on the type of vehicle. One method for detecting and classifying vehicles is to use edge detection, as described in U.S. Pat. No. 5,434,927 to Brady et al., incorporated herein by reference. Brady et al. describes the use of detecting edges of vehicles in images to classify vehicles. However, such classification is typically based on comparing edges from a captured image to an existing database of edge data related to various classes. With new vehicles being designed and manufactured every year, it becomes cumbersome, time consuming, and susceptible to errors to update an existing database. United States Patent Publication Number 2013/0246321 to Pandit et al. discusses a classification refinement tool; however, the mechanism described refines manual classification of assets, but does not automatically create new classes.

SUMMARY

The present disclosure provides an automatically updating vehicle classification system and method. This disclosure has several advantages over current vehicle classification systems. For example, it prevents the classification system and database from becoming obsolete by updating classes to align with new vehicles being introduced or vehicles from other regions that have never been captured and analyzed by a machine vision system interfaced with the vehicle classification system. The vehicle classification system further allows for development of a classification database in geographic areas or markets where vehicles are largely unknown or have not been previously classified. The vehicle classification system further provides a mechanism for distinguishing between a vehicle that is part of a new class and a vehicle that is an outlier because it has been modified or altered.

In one instance, the present disclosure provides an automatically updating vehicle classification system. The system comprises a processor which extracts from a vehicle image at least one of: a unique vehicle identifier from the vehicle image and visual features of the vehicle in the vehicle image. If the visual features are below a probability threshold for matching a vehicle class in a local database, the processor looks up the unique vehicle identifier in a registration database. The registration database stores vehicle registration information including unique vehicle identifiers and associated vehicle class information. If the vehicle class information associated with the vehicle identifier is not a class recognized by the processor, the processor creates a new vehicle class associated with the visual features of the vehicle.

In another instance, the present disclosure provides a method for automatically updating a vehicle classification system. The method comprises providing a vehicle image. The method further comprises extracting with a processor at least one of: a unique vehicle identifier from the vehicle image and visual features of the vehicle in the vehicle image. If the visual features of the vehicle are below a probability threshold for matching a vehicle class in a local database, looking up, with the processor, the unique vehicle identifier in a registration database. The registration database stores registration information including unique vehicle identifiers and associated vehicle class information. If the vehicle class information associated with the unique vehicle identifier is not a vehicle class recognized by the processor, creating, with the processor a new vehicle class associated with the visual features of the vehicle.

The system or method disclosed may further include the following features:
- vehicle class information includes at least one of or any combination of: make, model, body type, seat capacity, engine size, manufacture date, number of axles, and color;
- the new vehicle class is not activated for use until the processor has looked up a predetermined minimum number of unique vehicle identifiers associated with the new vehicle class;
- a camera that captures the vehicle image;
- the processor looks up the unique vehicle identifier in the registration database during a low volume time period;
- if the new class has only a single vehicle in it for a defined period of time, the single vehicle is designated as an outlier;
- the processor designates outliers for manual review;
- the processor creates new classes while the system is deployed for use;
- the processor updates classes while the system is deployed for use; or
- the unique vehicle identifier is displayed on a number plate.

BRIEF DESCRIPTION OF THE DRAWINGS

The following figures provide illustrations of the present invention. They are intended to further describe and clarify the invention, but not to limit the scope of the invention.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
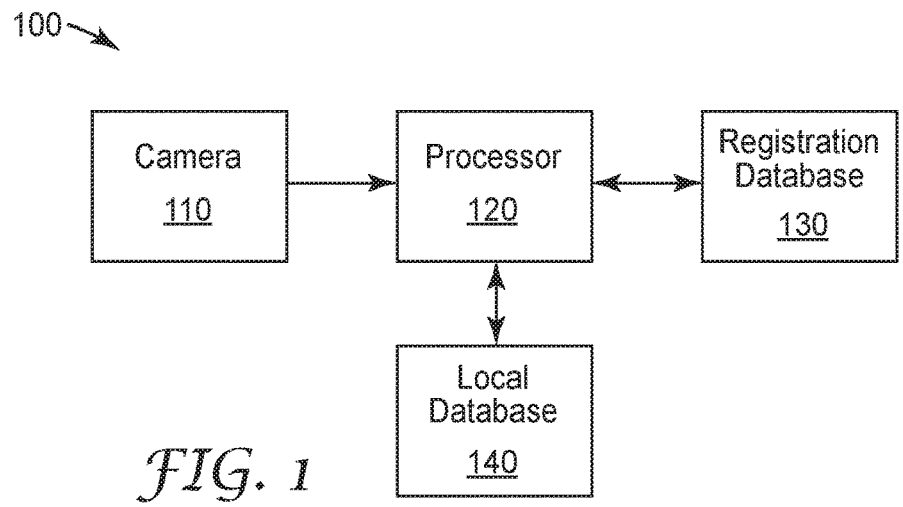
FIG. 1 shows a system diagram for an automatic learning vehicle classification system.
Figure 5:
FIG. 5 shows an exemplary isolated portion of a license plate.

FIG. 1 shows a system diagram for an automatic learning vehicle classification system 100. System 100 includes camera 110, processor 120, registration database 130 and local database 140. Camera 110 may be any type of machine vision system used to capture an image of a vehicle or a portion of a vehicle. A vehicle is a motorized transportation mechanism registered to an individual or entity. In some instances, camera 110 may capture a visible light image, in some instances camera 110 may capture an IR image, and in some instances camera 110 captures both visible light and IR images. In some configurations, camera 110 may include processing capabilities to process the contents of a captured image, such as the ability to isolate an image of a license plate from the remainder of the vehicle image as shown in FIG. 5. In some configurations, camera 110 may include optical character recognition (OCR) processing capabilities to identify the characters on a license plate. The characters displayed on a license plate is one example of a unique vehicle identifier as described herein. Characters displayed on the license plate include text and visual images. As an example, an image of a loon on a Minnesota specialty plate or the text ABC123. Other unique vehicle identifiers may include the type of license plate in combination with the characters displayed on the license plate.

Camera 110 transmits a vehicle image, or multiple images, in a digital format to processor 120. Processor 120 extracts at least one of: a unique vehicle identifier from the vehicle image and visual features of the vehicle in the vehicle image. Processor 120 may extract a unique vehicle identifier by isolating the license plate from the vehicle image and performing optical character recognition to extract the characters from the license plate. Processor 120 may extract visual features of the vehicle from the vehicle image using a process such as edge detection such as described in U.S. Pat. No. 5,434,927 to Brady et al. As used herein, a visual feature of a vehicle includes any individual or combination of the following: shape, edges, corners, and texture. In some instances, camera 110 and processor 120 may be incorporated into a single electronic device. In some instances, camera 110 and processor 120 may be in electronic communication with each other by being on a shared network, communicating through the internet, cellular communication or another electronic communication mechanism. In some instances, processor 120 may comprise multiple processors at different physical locations. Communication and processing may also may be performed through servers or in a Cloud computing environment.

Processor 120 then communicates with local database 140 to search for vehicle classes with visual features corresponding to the visual features extracted from the image. Local database 140 may be on a shared network with processor 120 or may otherwise be in communication with processor 120 through internet, cellular, or other communication mechanisms. A vehicle class, as used herein, is a group of vehicles with at least one common visual characteristic. The common visual characteristic may be body type of vehicle (e.g., car, SUV, truck, etc.), number of axles, color, make, model, or any combination thereof. Processor 120 then computes a probability or likelihood that the vehicle captured in the vehicle image falls within a given class based on the visual features extracted from the vehicle image as compared to the common visual characteristic of the class.

If the visual features are below a probability threshold for matching a vehicle class in local database 140, the processor looks up the unique vehicle identifier registration database 130 to retrieve vehicle class information from registration database 130. A probability threshold can be determined based on reviewing sample data sets to determine where the matching accuracy deteriorates below an acceptable level. A probability threshold may be, for example, 75, 80, 85, 90, 95 or 99 percent likelihood of accuracy. A higher probability threshold will result in more vehicles that are looked up in a registration database 130 or require manual review. A lower probability threshold may result in more incorrect vehicle classifications. A registration database is a database managed or controlled by a vehicle registration entity. One example of a registration database is the Driver and Vehicle Licensing Agency (DVLA). Another example is the local agency that issues vehicle registrations. The vehicle registration entity may be governmental or non-governmental. Registration database 130 may store vehicle registration information including unique vehicle identifiers, information about visual features, and associated vehicle class information. If the vehicle class information associated with the vehicle identifier extracted from the vehicle image is not a class recognized by processor 120, processor 120 creates and stores a new vehicle class associated with the visual features of the vehicle extracted from the vehicle image. The minimum number of new vehicles for a class may be 1, 2, 3, 4, 5 or more or any number that allows a sufficient sample size to create a representative class definition of the visual features of the vehicle.

In some instances, where a new vehicle class is created within local database 140, the new vehicle class is not activated for use until the processor has looked up a predetermined minimum number of unique vehicle identifiers to retrieve vehicle class information associated with the new vehicle class. The predetermined minimum number may be designated in system design or by a system user. For example, a predetermined minimum number may be 5, 10, 15 or 20 or any other number designated within the system.

In some instances, processor 120 will look up the unique vehicle identifier in the registration database during a low volume time period. This delayed look up allows the processor to manage processing and distribute processing loads so as to maximize efficiency and average processing speed. A low volume time period may be a time when there is low traffic flow through an area where camera 110 is capturing vehicle images.

In some instances, if the new class has only a single vehicle in it for a defined period of time the single vehicle is designated as an outlier. The defined period of time may be set by a system user. In a location with higher traffic flow, the defined period of time may be shorter because of the larger number of vehicles being captured by the machine vision system. In a location with lesser traffic flow, the defined period of time may be longer to allow for enough vehicle images to be captured by a machine vision system to have an acceptable level of confidence that the vehicle is an outlier. An outlier is a vehicle that has been altered or modified such that it has different visual features as compared to other vehicles manufactured with the same make, model, body type, seat capacity, engine size, manufacture date, number of axles, and color.

In some instances, once a vehicle is designated as an outlier, processor 120 designates the outlier for manual review. During manual review, a user interacting with the system can analyze the image to confirm or override the outlier designation of the vehicle image.

In some instances, processor 120 creates new vehicle classes within local database 140 while system 100 is deployed for use or is actively in use. This allows for automatic learning and updating of system 100 without requiring down-time, or time consuming or costly updates or adaptations to system 100.

In some instances, processor 120 updates classes while the system is deployed for use. This allows for classes to be refined based on data from multiple vehicle images providing a more detailed or more complete class definition.

Figure 2:
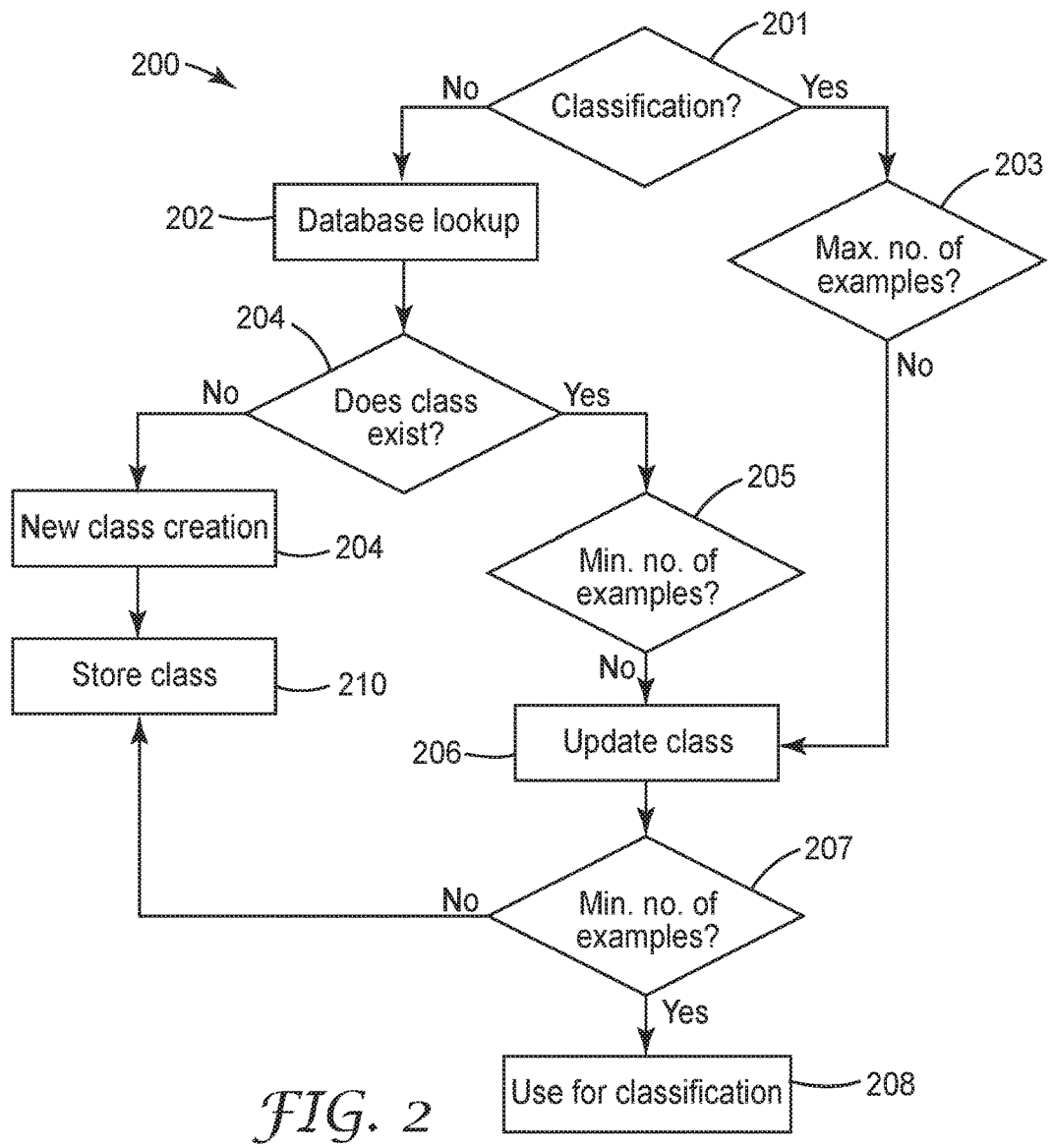
FIG. 2 shows a flow chart for an automatic learning vehicle classification method.

FIG. 2 shows a flow chart 200 for an automatic learning vehicle classification method. The method shown in flow chart 200 includes a detailed explanation of steps consistent with the present disclosure; however, not all steps shown in flow chart 200 are required for the present invention. Flow chart 200 begins with classification step 201, where a processor queries a local database to determine whether visual features extracted from a vehicle image fit within a class in the local database. If "yes", the processor moves to step 203. In step 203, the processor determines whether the class into which the vehicle from the vehicle image fits has reached a maximum number of examples within the local database. A maximum number of examples is enough examples for a class to have a complete set of information regarding the visual features of the vehicle belonging in the class. A maximum number may depend on the quality and perspective of the vehicle images. In one instance, a maximum number of examples may be 10 examples, 15 examples, 20 examples or more. If the class has not reached such a maximum, the class is updated in step 206 to reflect the additional information provided by the vehicle features extracted from the vehicle image.

If in step 201, the processor determines that the visual features extracted from the vehicle image do not fit within a class in the local database, then in step 202, the processor queries the registration database using the unique vehicle identifier to determine what class the vehicle from the vehicle image fits within. If the query to the registration database produces a class that already exists within the local database (step 204), then in step 205, the processor determines whether it has the minimum number of examples required for the particular class to be activated. If the local database does not yet have the minimum number of examples for the particular class to be activated, then in step 206 the class is updated based on information from visual features extracted from the vehicle image. After the class has been updated, in step 207, the local processor determines whether the class now has the minimum number of examples to be activated. If "yes", the class does have the minimum number of examples to be activated, in step 208 the class is made available for classification within the local database.

If, in step 204, the query to the registration database results in a class that does not yet exist within the local database, then in step 209, the processor creates a new class within local database. In step 210, the new class is stored in the local database along with data from the visual features extracted from the vehicle image.

Figure 3:
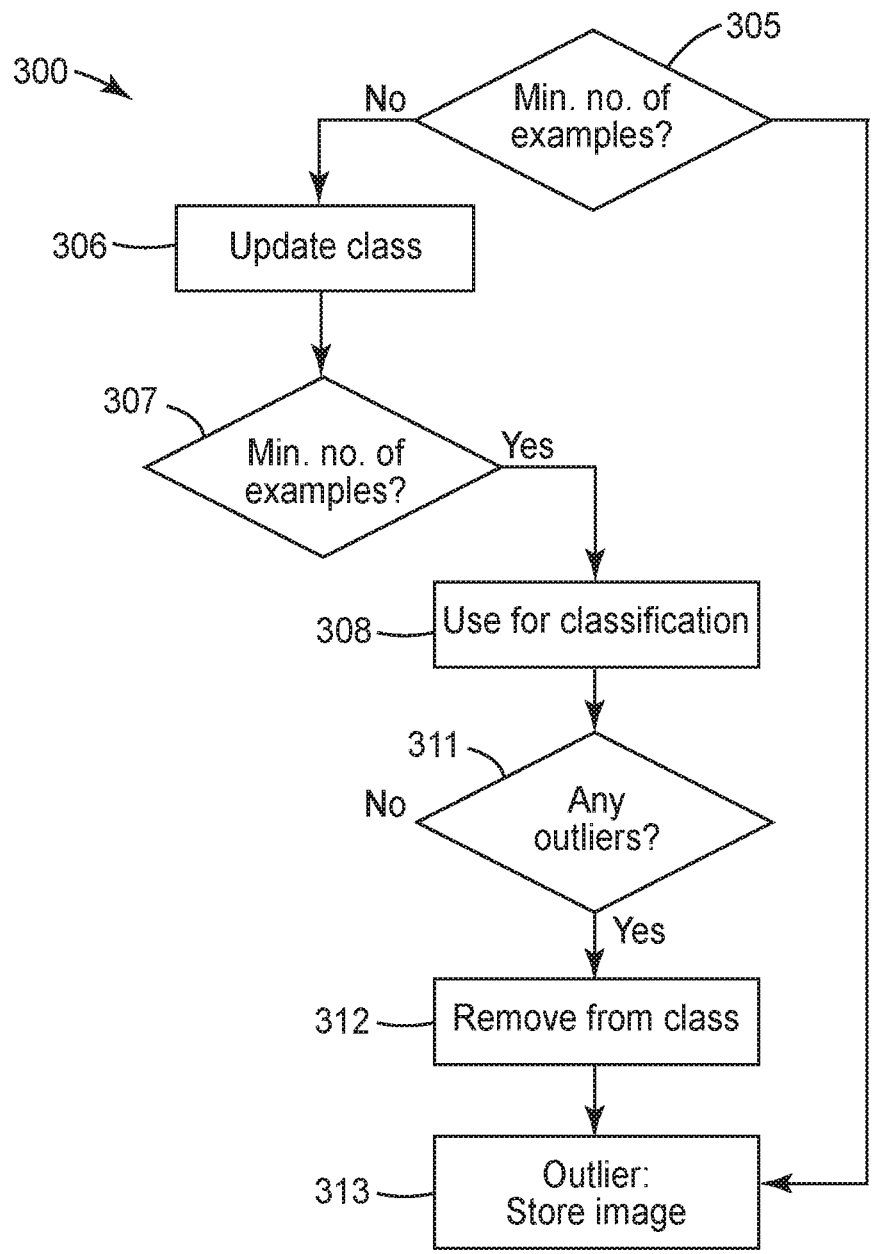
FIG. 3 shows a flow chart for identifying outliers.

FIG. 3 shows a flow chart 300 for identifying outliers. The steps shown in flow chart 300 are a variation of the steps following step 205 shown in FIG. 2. The steps shown in flow chart 300 can be implemented in combination with those shown in flow chart 200 in FIG. 2.

In step 305, the processor determines whether the local database has the minimum number of examples required for the particular class to be activated. If the local database does not yet have the minimum number of examples for the particular class to be activated, then in step 306 the class is updated based on information from visual features extracted from the vehicle image. After the class has been updated, in step 307, the processor determines whether the class now has the minimum number of examples to be activated. If "yes", the class does have the minimum number of examples to be activated, then in step 308 the class is made available for classification within the local database.

In step 311, the processor searches for outliers by comparing each example within the class to the other examples within the class to determine whether the visual features for each example is sufficiently consistent with each of the other examples within the class to remain in the class. If there are any outliers identified, in step 312, the particular example or examples that are identified as outliers are removed from the class. In step 313, an image of the outlier is stored. The image may be queued for additional review (in some instances manual review) or processing at a later time.

In step 305, if the database already has the minimum number of examples for a particular class, and if the vehicle fits within a class, but has a visual feature that distinguishes the vehicle from the remainder of the class, it is designated as an outlier in step 313. This prevents the aberrant visual features from inaccurately impacting the class definition.

Figure 4:
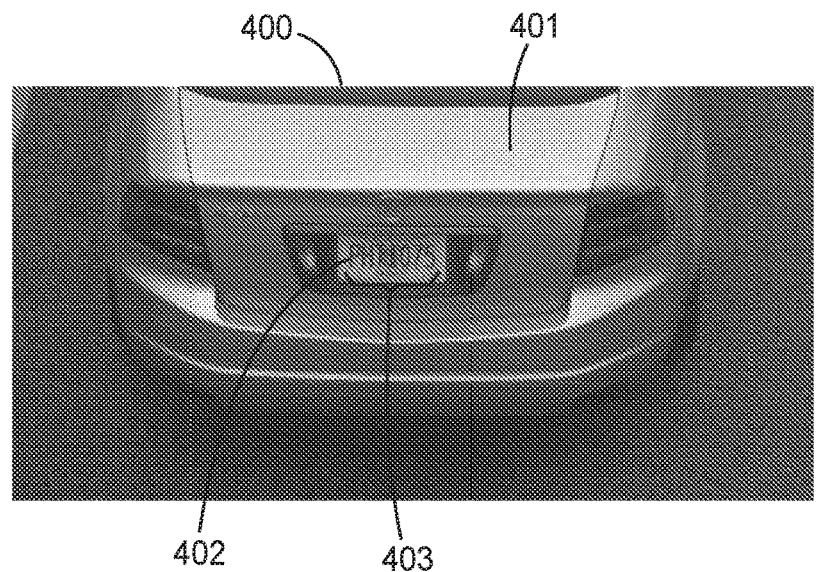
FIG. 4 shows an exemplary vehicle image.
Figure 6:
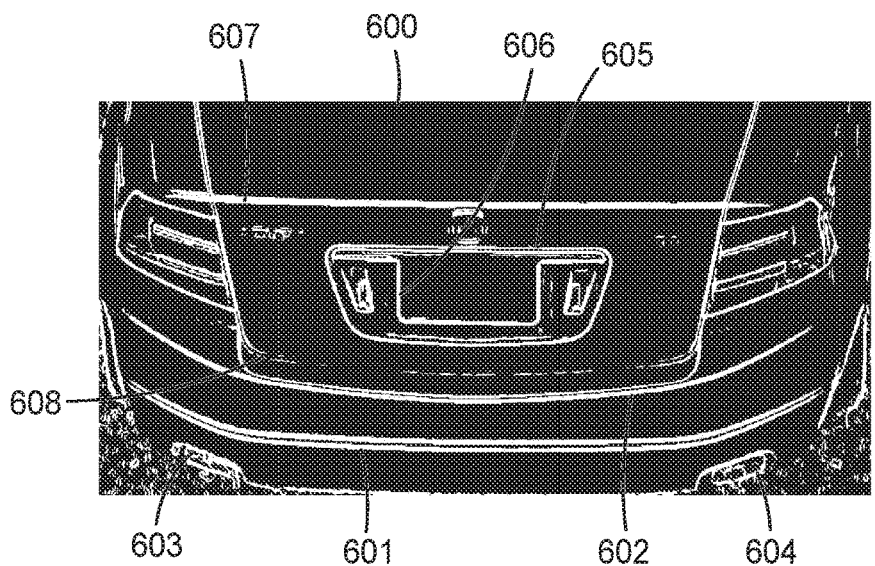
FIG. 6 shows an exemplary vehicle image with visual features indicated.

FIGS. 4-6 show examples of the images associated with the system and method disclosed herein. FIG. 4 shows an exemplary vehicle image 400. Image 400 is an overview image in visible light of the rear portion of vehicle 401. Image 400 also includes license plate 402 on vehicle 401. License plate 402 displays unique vehicle identifier 403. Some camera or machine vision systems capture both infrared and visible light images of vehicles. For purposes of simplicity, a vehicle image or image of a vehicle includes either or both of an infrared and visible light image of the same vehicle.

FIG. 5 shows an exemplary isolated portion of a license plate 502. License plate 502 displays unique vehicle identifier 503—"PHT1075". The isolated portion of license plate 502 may have been extracted from an infrared image corresponding to the visible light image shown in FIG. 4.

FIG. 6 shows an exemplary vehicle image 600 with visual features indicated. Visual features identified in this particular image are edges. For example, edges 601 and 602 help to identify the curvature of the vehicle bumper. Edges 603 and 604 show the shape of the area surrounding the exhaust pipes. Edges 605 and 606 show the shape of the area near the license plate. Edges 607 and 608 show the shape of the lid of the trunk. Other edges or other visual features can be extracted from the image and used in accordance with the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. An automatically updating vehicle classification system, comprising:
    a processor which extracts from a vehicle image a unique vehicle identifier from the vehicle image and visual features of the vehicle in the vehicle image;
    wherein if the visual features are below a probability threshold for matching a vehicle class in a local database, the processor looks up the unique vehicle identifier in a registration database;
    wherein the registration database stores vehicle registration information including unique vehicle identifiers and associated vehicle class information;
    wherein if the vehicle class information associated with the vehicle identifier is not a class recognized by the processor, the processor creates a new vehicle class associated with the visual features of the vehicle; and
    wherein the probability threshold is determined based on sample data sets to determine where matching accuracy is below a particular level.

2. The system of claim 1, wherein vehicle class information includes at least one of or any combination of: make, model, body type, seat capacity, engine size, manufacture date, number of axles, and color.

3. The system of claim 1, wherein the new vehicle class is not activated for use until the processor has looked up a predetermined minimum number of unique vehicle identifiers associated with the new vehicle class.

4. The system of claim 1, further comprising a camera that captures the vehicle image.

5. The system of claim 1, wherein the processor looks up the unique vehicle identifier in the registration database during a low volume time period.

6. The system of claim 1, wherein if the new class has only a single vehicle in it for a defined period of time, the single vehicle is designated as an outlier.

7. The system of claim 6, wherein the processor designates outliers for manual review.

8. The system of claim 1, wherein the processor creates new classes while the system is deployed for use.

9. The system of claim 1, wherein the processor updates classes while the system is deployed for use.

10. The system of claim 1, wherein the unique vehicle identifier is displayed on a number plate.

11. A method for automatically updating a vehicle classification system, comprising:
    providing a vehicle image;
    extracting, with a processor, a unique vehicle identifier from the vehicle image and visual features of the vehicle in the vehicle image; and
    if the visual features of the vehicle are below a probability threshold for matching a vehicle class in a local database, looking up, with the processor, the unique vehicle identifier in a registration database;

wherein the registration database stores registration information including unique vehicle identifiers and associated vehicle class information;

wherein if the vehicle class information associated with the unique vehicle identifier is not a vehicle class recognized by the processor, creating, with the processor a new vehicle class associated with the visual features of the vehicle; and wherein the probability threshold is determined based on sample data sets to determine where matching accuracy is below a particular level.

12. The method of claim 11, wherein vehicle class information includes at least one of or any combination of: make, model, body type, number of axles, seat capacity, engine size, manufacture date and color.

13. The method of claim 11, wherein the new vehicle class is not activated for use until the processor has looked up a minimum number of unique vehicle identifiers associated with the new class.

14. The method of claim 11, further comprising capturing, with a camera, the vehicle image.

15. The method of claim 11, wherein the processor looks up the unique vehicle identifier in the registration database during a low volume time period.

16. The method of claim 11, further comprising designating the vehicle as an outlier if the new class has only the single vehicle in it for a defined period of time.

17. The method of claim 16, further comprising designating the outliers for manual review.

18. The method of claim 11, further comprising creating, with the processor, new vehicle classes while the system is deployed for use.

19. The method of claim 11, wherein the processor updates vehicle classes while the system is deployed for use.

20. The method of claim 11, wherein the unique vehicle identifier is displayed on a number plate.

\* \* \* \* \*